US012618417B2

(12) United States Patent
Mizuta

(10) Patent No.: US 12,618,417 B2
(45) Date of Patent: May 5, 2026

(54) BLOWER

(71) Applicant: MAKITA CORPORATION, Anjo (JP)

(72) Inventor: Kazuki Mizuta, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/226,295

(22) Filed: Jun. 3, 2025

(65) Prior Publication Data

US 2026/0022710 A1      Jan. 22, 2026

(30) Foreign Application Priority Data

Jul. 17, 2024    (JP) ................................. 2024-114306

(51) Int. Cl.
*F04D 29/66* (2006.01)
*A01G 20/47* (2018.01)
*F04D 29/44* (2006.01)

(52) U.S. Cl.
CPC ........... *F04D 29/665* (2013.01); *A01G 20/47* (2018.02); *F04D 29/444* (2013.01); *F05D 2250/52* (2013.01)

(58) Field of Classification Search
CPC .. F04D 29/4226; F05D 2250/52; F24F 13/24; A01G 20/47
See application file for complete search history.

(56) References Cited

U.S. PATENT DOCUMENTS

| | | | | |
|---|---|---|---|---|
| 9,011,092 B2 * | 4/2015 | Eguchi | ................. | F04D 29/281 |
| | | | | 415/206 |
| 10,088,194 B2 * | 10/2018 | Cocks | ................... | F04D 29/681 |
| 10,323,853 B2 * | 6/2019 | Zakula | ................. | F04D 29/441 |
| 10,570,928 B2 * | 2/2020 | Cocks | .................... | F04D 17/16 |
| 11,965,523 B1 * | 4/2024 | Greulich | ............ | F04D 29/4226 |
| 2016/0309661 A1 * | 10/2016 | Eakins, Jr. | ............. | A01G 20/47 |

FOREIGN PATENT DOCUMENTS

JP          2022-123186 A      8/2022

* cited by examiner

*Primary Examiner* — Justin D Seabe
(74) *Attorney, Agent, or Firm* — Sughrue Mion, PLLC

(57)          ABSTRACT
A blower may include: a prime mover, a fan configured to be driven by the prime mover, a blower duct through which an airflow generated by the fan flows; a plate portion disposed inside the blower duct and having side surfaces extending along a direction in which the airflow flows; and a protrusion protruding from the side surfaces near a downstream end of the plate portion in a direction blocking the airflow.

14 Claims, 10 Drawing Sheets

LEFT
FRONT
RIGHT
REAR

Without Measures

With Measures

Noise Level [dBA]

Motor Rotation Speed [rpm]

BLOWER

REFERENCE TO RELATED APPLICATIONS

This application claims priority from Japanese Patent Application No. 2024-114306 filed on Jul. 17, 2024. The entire content of the priority application is incorporated herein by reference.

TECHNICAL FIELD

The art disclosed herein relates to a blower.

BACKGROUND ART

Japanese Patent Application Publication NO. 2022-123186 describes a blower. The blower includes: a prime mover; a fan configured to be driven by the prime mover; a blower duct through which an airflow generated by the fan flows; and a plate portion disposed inside the blower duct and having side surfaces extending along a direction in which the airflow flows.

SUMMARY

In the above-mentioned blower, a vortex flow may be periodically generated at a downstream end of the plate portion. Because a frequency at which such vortex flow occurs varies according to a velocity of the airflow, the frequency varies according to a rotational speed of the fan. Due to this, depending on the fan rotational speed, the frequency at which the vortex flow occurs may coincide a vibratory resonant frequency of the plate portion and/or blower duct or an acoustic resonant frequency of the blower duct, all of which may result in loud noise. The present teachings provide an art configured to suppress generation of loud noise in a blower.

A blower disclosed herein may comprise: a prime mover; a fan configured to be driven by the prime mover; a blower duct through which an airflow generated by the fan flows; a plate portion disposed inside the blower duct and having side surfaces extending along a direction in which the airflow flows; and a protrusion protruding from the side surfaces near a downstream end of the plate portion in a direction blocking the airflow.

According to the above configuration, since the protrusion is disposed near the downstream end of the plate portion, periodical generation of vortex flow can be suppressed at the downstream end of the plate portion. Due to this, the vibratory resonance of the plate portion and/or blower duct or the acoustic resonance of the blower duct can be suppressed, by which generation of loud noise can also be suppressed.

DESCRIPTION

Figure 1:
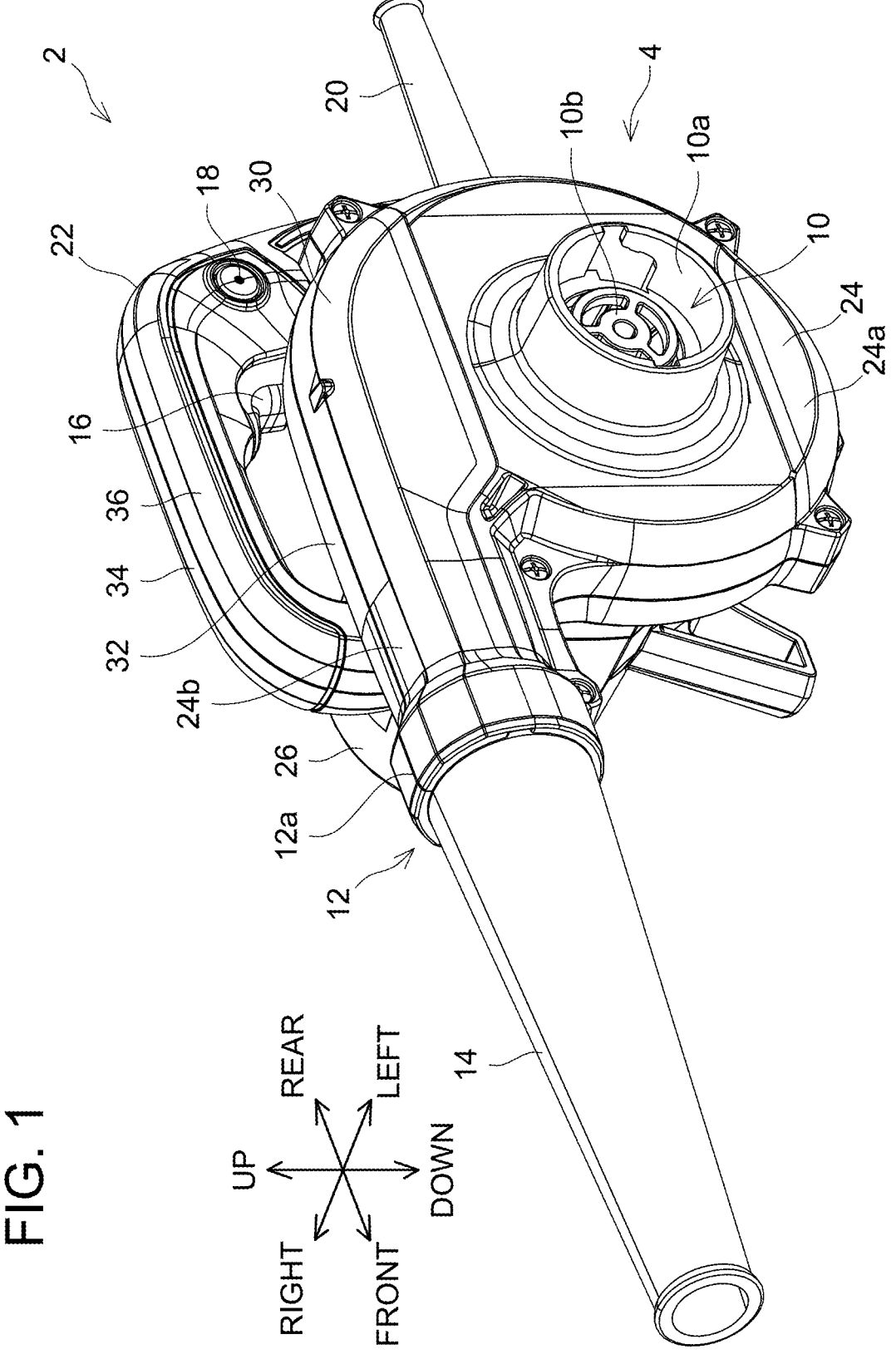
FIG. 1 illustrates a perspective view of a blower 2 according to an embodiment.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the disclosure. Furthermore, each of the additional features and teachings disclosed below may be utilized separately or in conjunction with other features and teachings to provide improved blowers, as well as methods for using and manufacturing the same.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, with respect to the direction blocking the airflow, a height of the protrusion may be within a range of 1% to 50% of a thickness of the plate portion.

According to the above configuration, periodical generation of vortex flow can be suppressed without greatly affecting an air volume of the blower.

In one or more embodiments, with respect to the direction in which the airflow flows, a width of the protrusion may be within a range of 1% to 50% of a minimum width of the plate portion.

According to the above configuration, without greatly affecting the air volume of the blower, periodical generation of vortex flow can be suppressed.

In one or more embodiments, the protrusion may comprise a plurality of protrusions, and the protrusions may be arranged intermittently.

According to the above configuration, as compared to a case where the protrusion is continuously disposed, an effect thereof imposed on the air volume of the blower can be mitigated.

In one or more embodiments, the protrusion may be arranged continuously.

According to the above configuration, when the plate portion including the protrusion is produced by integral molding of a resin material, workability in releasing the plate portion from a mold can be improved.

In one or more embodiments, the protrusion may be arranged only on one of the side surfaces of the plate portion, and the protrusion may not be arranged on the other of the side surfaces of the plate portion.

According to the above configuration, as compared to a case where the protrusions are disposed on both of the side surfaces of the plate portion, an effect thereof imposed on the air volume of the blower can be mitigated.

In one or more embodiments, the prime mover may be an electric motor.

When the electric motor is used as the prime mover, it is more quiet when the electric motor operates than when an internal engine is used as the prime mover. As such, if loud noise is generated in using the electric motor, user comfort would be greatly impaired. According to the above configuration, in the blower which uses the electric motor as the prime mover, generation of loud noise can be suppressed.

EMBODIMENT

A blower 2 shown in FIG. 1 comprises a housing 4, a fan 6 (see FIG. 2), an electric motor 8 (see FIG. 2), a suction port 10, an exhaust port 12, a nozzle 14, a trigger switch 16, a lock button 18, and a power cable 20. The blower 2 is a hand-held work machine configured to be held and used by a user with one hand. The nozzle 14 is configured to be detachably attached selectively to either the suction port 10 or the exhaust port 12, depending on which work the blower 2 is used for. For example, by using the blower 2 with the nozzle 14 attached to the exhaust port 12, the blower 2 can perform a blowing work of blowing air from a tip of the nozzle 14 to blow away leaves on a ground, for example. Also, by using the blower 2 with the nozzle 14 attached to the suction port 10 and a dust bag (not illustrated) attached to the exhaust port 12, the blower 2 can perform a suctioning work of suctioning air from the tip of the nozzle 14 to collect dust, for example, into the dust bag. Here, in the following description, a direction in which air flows at the exhaust port 12 will be referred to as "front/frontward" while a direction opposite from the front direction will be referred to as "rear/rearward". Also, a direction in which air flows at the suction port 10 will be referred to as "right/rightward" while a direction opposite from right will be referred to as "left/leftward". Further, a direction orthogonal both to a front-rear direction and a left-right direction will be referred to as an "up-down direction".

Figure 2:
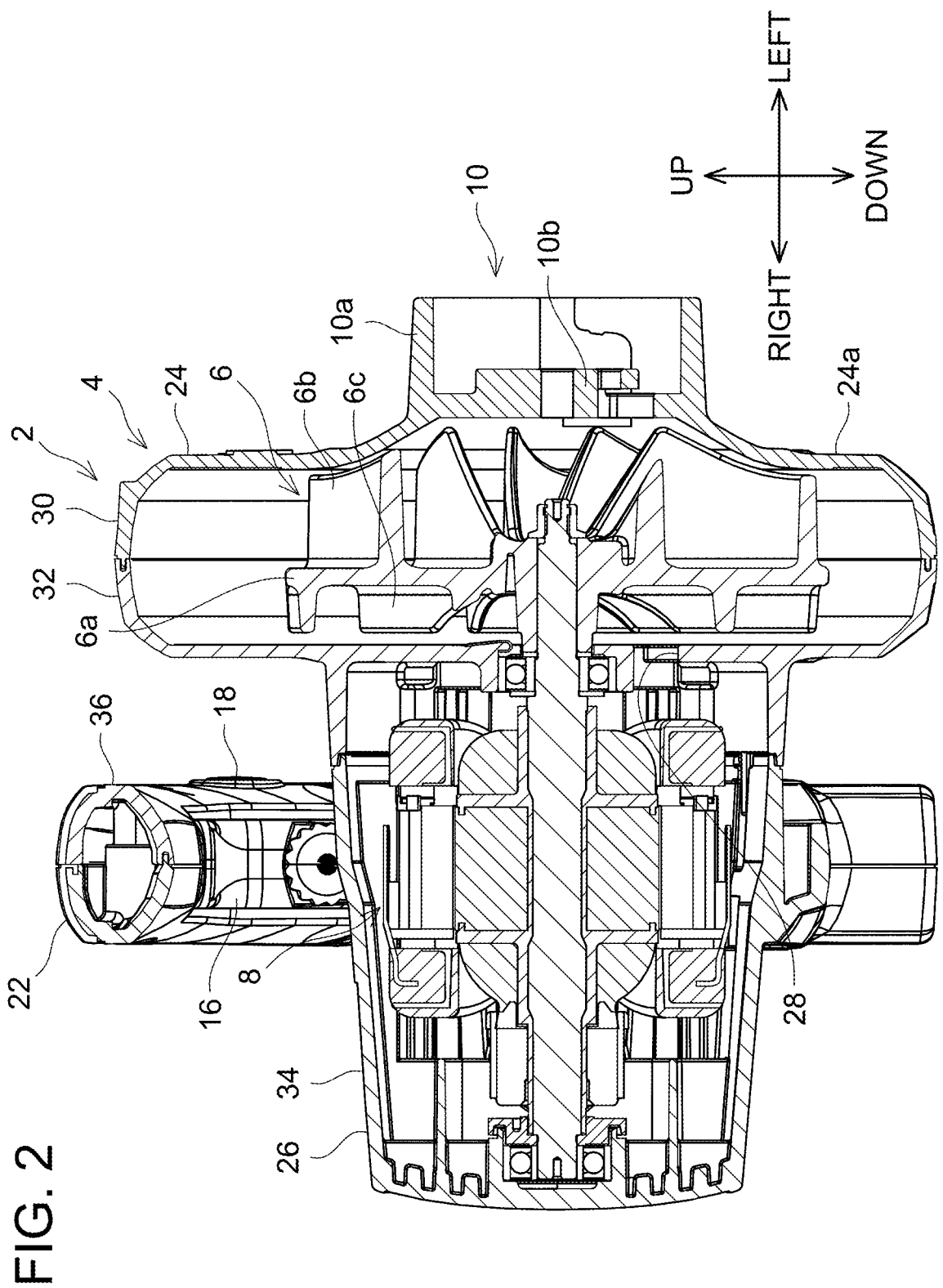
FIG. 2 illustrates a cross-sectional view of the blower 2 according to the embodiment.

As illustrated in FIG. 2, the housing 4 comprises a handle 22 configured to be grasped by the user, a fan case 24 configured to accommodate the fan 6, and a motor case 26 configured to accommodate the electric motor 8. The trigger switch 16 and the lock button 18 are disposed on the handle 22. Also, the power cable 20 (see FIG. 3) is connected to the handle 22. When the user pulls the trigger switch 16 inward and thus the trigger switch 16 is turned on, electric power is supplied from the power cable 20 to the electric motor 8, by which the fan 6 rotates. At this occasion, a rotation speed of the electric motor 8 varies according to a degree at which the trigger switch 16 is pulled. When the user has his/her hand released from the trigger switch 16 and thus the trigger switch 16 is turned off, the supply of electric power from the power cable 20 to the electric motor 8 is cut off, by which the fan 6 stops rotating. When the user further pushes the lock button 18 in a state of having pulled the trigger switch 16, the trigger switch 16 remains in the state of being pulled even if the user subsequently releases his/her hand from the lock button 18 and/or the trigger switch 16. In this case, the electric motor 8 is maintained in a state of rotating at a designated rotation speed.

The suction port 10 communicates inside and outside of the fan case 24. The suction port 10 comprises a nozzle receiving portion 10a having a cylindrical shape and protruding leftward, and a filter portion 10b configured to suppress entry of foreign matter/object into the fan case 24. The suction port 10 is disposed substantially coaxial with a rotation axis of the fan 6 inside the fan case 24. The fan case 24 and the motor case 26 are in communication with each other through a motor exhaust port 28. Also, a right end of the motor case 26 comprises a motor suction port (not illustrated) which communicates with inside and outside of the motor case 26.

Figure 3:
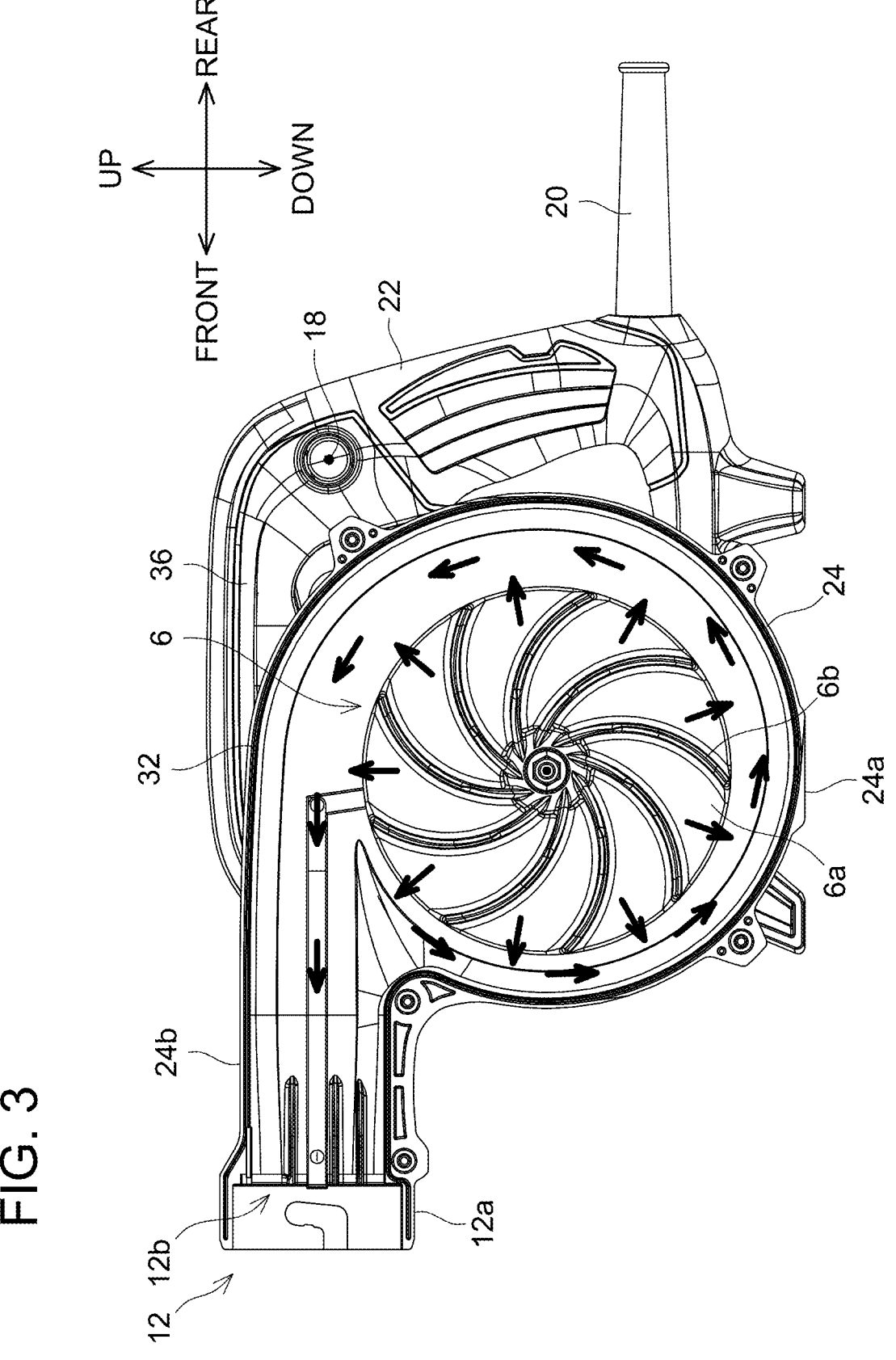
FIG. 3 illustrates a side view showing an inside of a fan case 24 in the blower 2 according to the embodiment.

The fan 6 comprises a base 6a having a circular plate shape, a first fan 6b protruding leftward from a left surface of the base 6a, and a second fan 6c protruding rightward from a right surface of the base 6a. Each of the first fan 6b and the second fan 6c functions as a centrifugal fan. As illustrated in FIG. 3, the fan case 24 comprises a volute portion 24a having a volute shape and a straight tube portion 24b having a straight tube shape. As illustrated in FIG. 2, when the fan 6 rotates, air is suctioned from the suction port 10 into the volute portion 24a of the fan case 24, and the air is pushed outward from inside to outside in a radial direction of the first fan 6b. Also, when the fan 6 rotates, the second fan 6c suctions air from the motor exhaust port 28 into the volute portion 24a of the fan case 24, and the air is pushed from inside to outside of the radial direction of the second fan 6c. At this occasion, air is suctioned from the motor suction port into the motor case 26, and the air within the motor case 26 flows from the motor exhaust port 28 into the fan case 24, and this airflow within the motor case 26 causes the electric motor 8 to be cooled. As illustrated in FIG. 3, the air, which is pushed outward from inside to outside in the radial direction due to the rotation of the first fan 6b and the second fan 6c, flows along an inner surface of the volute portion 24a on the outside in the radial direction, flows through the straight tube portion 24b, and then is fed frontward from the exhaust port 12.

As illustrated in FIG. 2, the housing 4 comprises a left-side housing 30 defining a left-side portion of the fan case 24, a middle housing 32 defining a right-side portion of the fan case 24 and a left-side portion of the motor case 26, a right-side housing 34 defining a right-side portion of the motor case 26 and a right-side portion of the handle 22, and a handle housing 36 defining a left-side portion of the handle 22.

Figure 4:
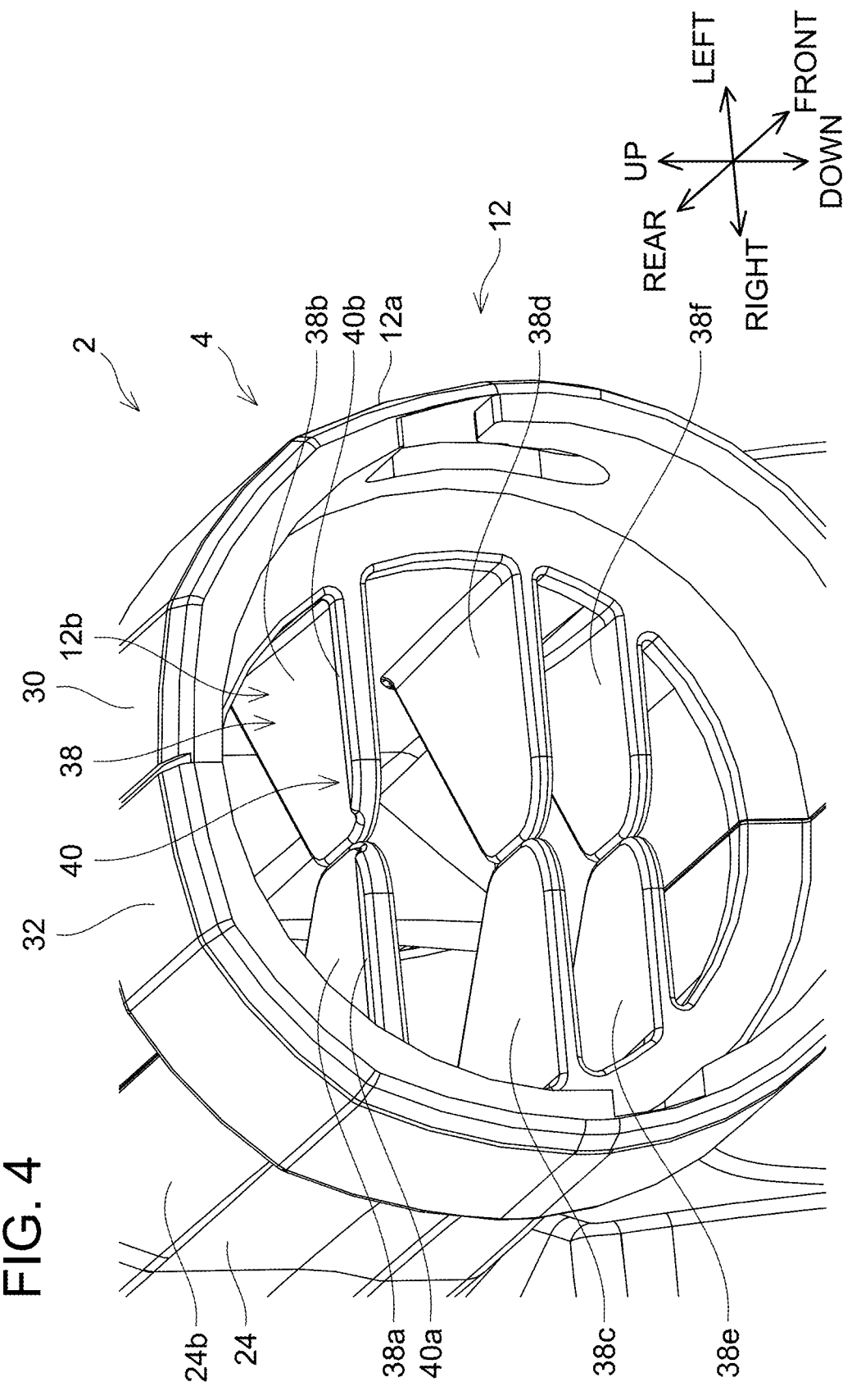
FIG. 4 illustrates a perspective view of an exhaust port 12 and its surroundings of the blower 2 according to the embodiment.

As illustrated in FIG. 4, the exhaust port 12 is disposed at a downstream end (i.e., front end) of the straight tube portion 24b. The exhaust port 12 comprises a nozzle receiving portion 12a having a cylindrical shape and protruding frontward and a filter portion 12b configured to suppress entry of foreign matter/object into the fan case 24. In the present embodiment, the filter portion 12b is composed of a plurality of plate portions 38. The plate portions 38 all have a substantially plate shape extending along the front-rear direction and the left-right direction. The plurality of plate portions 38 comprises a first right plate portion 38a, a first left plate portion 38b, a second right plate portion 38c, a second left plate portion 38d, a third right plate portion 38e, and a third left plate portion 38f. The first right plate portion 38a, the second right plate portion 38c, and the third right plate portion 38e are integrally and seamlessly formed with the middle housing 32, and each extends leftward from an inner surface of the middle housing 32. The second right plate portion 38c is disposed below the first right plate portion 38a, and the third right plate portion 38e is disposed below the second right plate portion 38c. The first left plate portion 38b, the second left plate portion 38d, and the third left plate portion 38f are integrally and seamlessly formed with the left-side housing 30, and each extends rightward from an inner surface of the left-side housing 30. The second left plate portion 38d is disposed below the first left plate portion 38b, and the third left plate portion 38f is disposed below the second left plate portion 38d.

Figure 5:
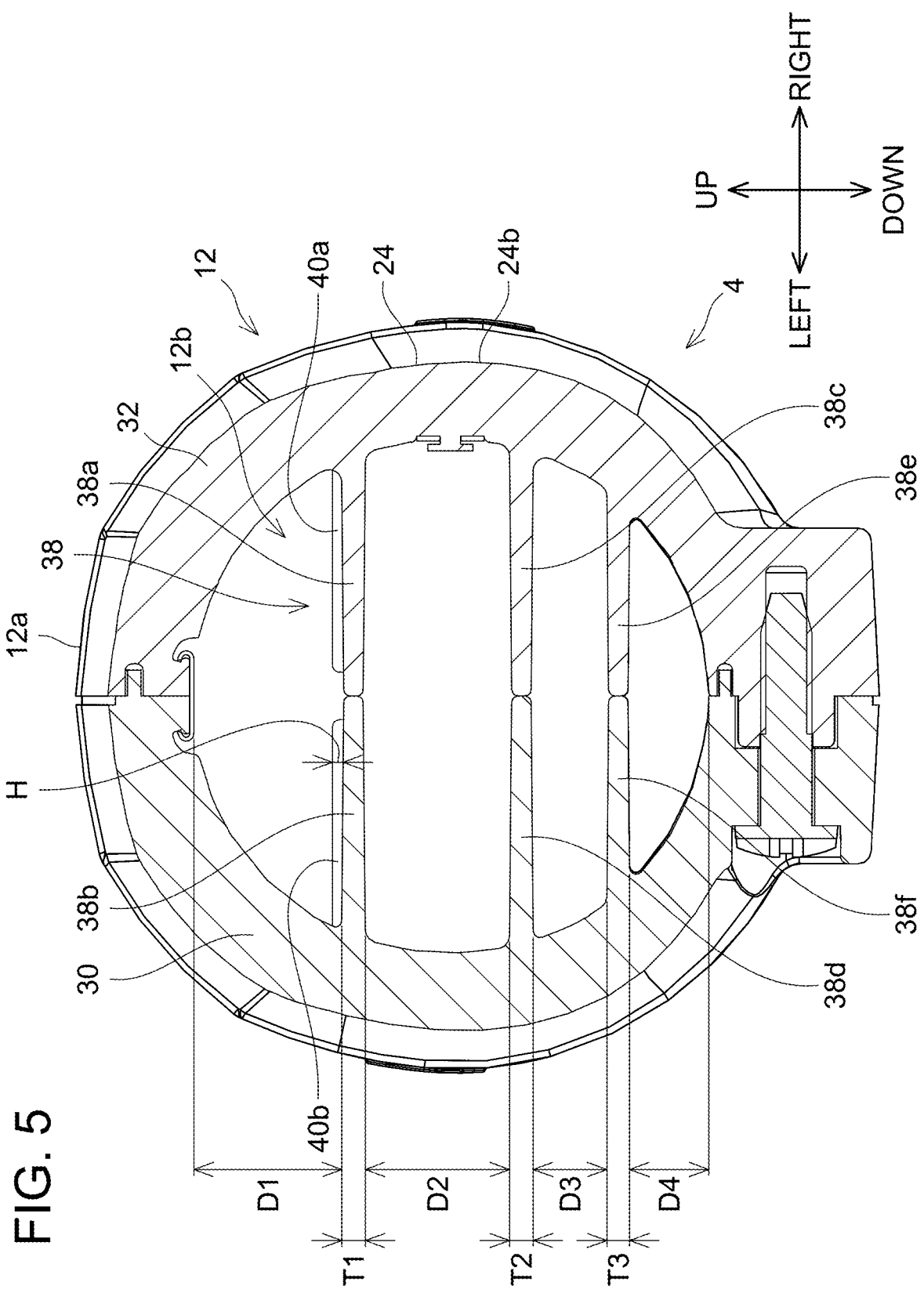
FIG. 5 illustrates a cross-sectional view of the exhaust port 12 and its surroundings in the blower 2 according to the embodiment.

As illustrated in FIG. 5, positions in the up-down direction of the first right plate portion 38a and the first left plate portion 38b are substantially equal to each other. A distance D1 in the up-direction between a highest part of an inner surface of the exhaust port 12 and an upper surface of the first right plate portion 38a (or upper surface of the first left plate portion 38b) is within a range of 2 mm to 12 mm, and is 11 mm, for example. The first right plate portion 38a and the first left plate portion 38b have thicknesses in the up-down direction that are substantially equal to each other. A thickness T1 in the up-down direction of the first right plate portion 38a (or the first left plate portion 38b) is within a range of 0.1 mm to 5 mm, and is 1.5 mm, for example. A right end of the first right plate portion 38a and a left end of the first left plate portion 38b are in contact with each other.

Positions in the up-down direction of the second right plate portion 38c and the second left plate portion 38d are substantially equal to each other. A distance D2 between a lower surface of the first right plate portion 38a (or lower surface of the first left plate portion 38b) and an upper surface of the second right plate portion 38c (or upper surface of the second left plate portion 38d) is within a range of 2 mm to 12 mm, and is 11.5 mm, for example. The second right plate portion 38c and the second left plate portion 38d have thicknesses in the up-down direction that are substantially equal to each other. A thickness T2 in the up-down direction of the second right plate portion 38c (or the second left plate portion 38d) is within a range of 0.1 mm to 5 mm, and is 1.5 mm, for example. In the present embodiment, the thickness T2 in the up-down direction of the second right plate portion 38c (or the second left plate portion 38d) is substantially equal to the thickness T1 in the up-down direction of the first right plate portion 38a (or the first left plate portion 38b). A right end of the second right plate portion 38c and a left end of the second left plate portion 38d are in contact with each other.

Positions in the up-down direction of the third right plate portion 38e and the third left plate portion 38f are substantially equal to each other. A distance D3 in the up-down direction between a lower surface of the second right plate portion 38c (or lower surface of the second left plate portion 38d) and an upper surface of the third right plate portion 38e (or upper surface of the third left plate portion 38f) is within a range of 2 mm to 12 mm, and is 6 mm for example. A distance D4 in the up-down direction between a lower surface of the third right plate portion 38c (or lower surface of the third left plate portion 38f) and a lowest part of the inner surface of the exhaust port 12 is within a range of 2 mm to 12 mm, and is 6 mm, for example. The third right plate portion 38c and the third left plate portion 38f have thicknesses in the up-down direction that are substantially equal to each other. A thickness T3 in the up-down direction of the third right plate portion 38c (or the third left plate portion 38f) is within a range of 0.5 mm to 5 mm, and is 1.5 mm, for example. In the present embodiment, the thickness T3 in the up-down direction of the third right plate portion 38e (or the third left plate portion 38f) is substantially equal to the thickness T2 in the up-down direction of the second right plate portion 38c (or the second left plate portion 38d). A right end of the third right plate portion 38e and a left end of the third left plate portion 38f are in contact with each other.

As illustrated in FIG. 4, the first right plate portion 38a, the second right plate portion 38c, and the third right plate portion 38e have a substantially right angle trapezoidal shape in a plan view from above, and in this trapezoid, a front side is substantially perpendicular to a right side and a left side and a length of the right side is longer than a length of the left side. The first left plate portion 38b, the second left plate portion 38d, and the third left plate portion 38f have a substantially right angle trapezoidal shape in the plan view from above, and in this trapezoid, a front side is substantially perpendicular to a right side and a left side and a length of the left side is longer than a length of the right side.

Figure 6:
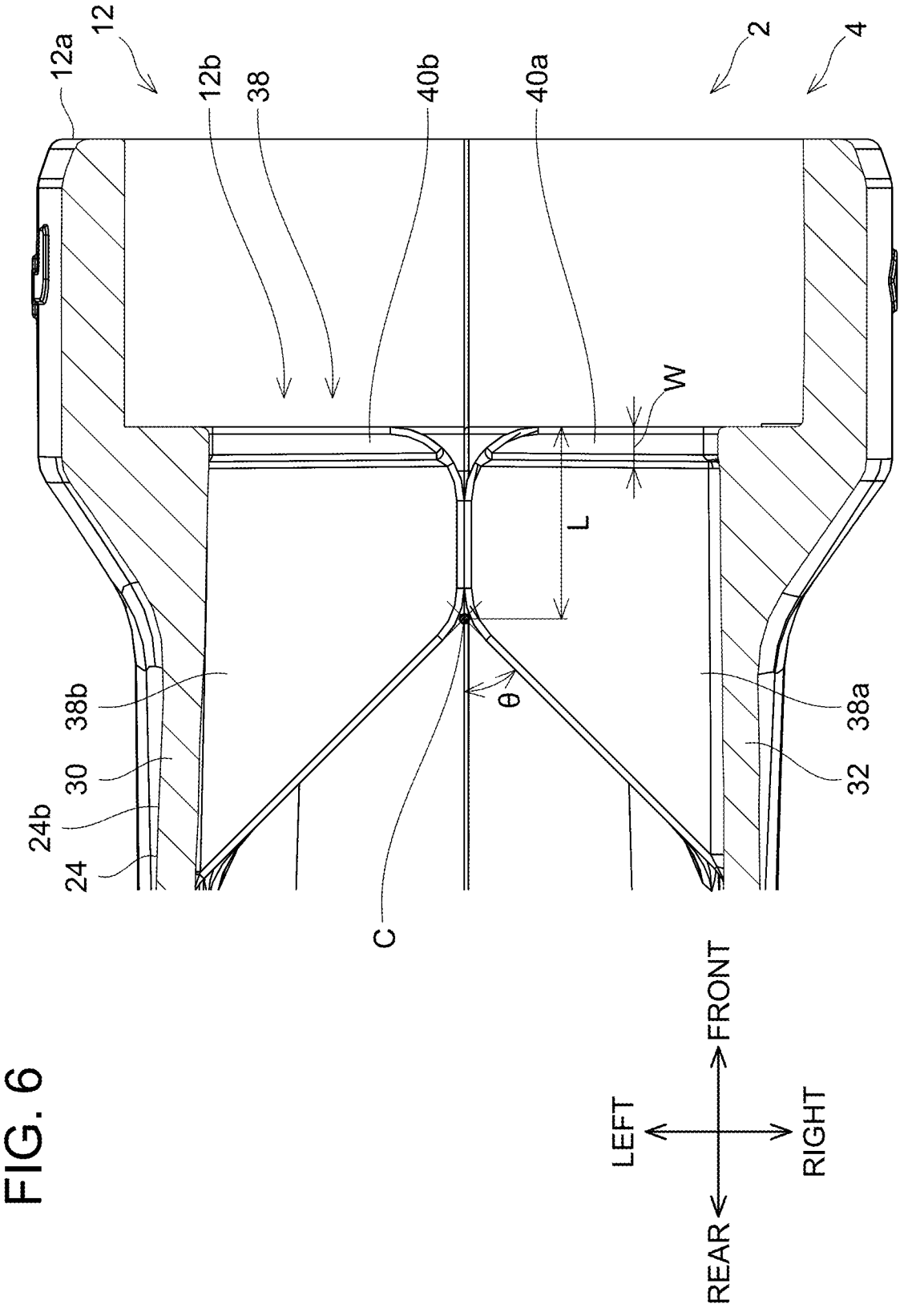
FIG. 6 illustrates a longitudinal-sectional view of the exhaust port 12 and its surroundings in the blower 2 according to the embodiment.

As illustrated in FIG. 6, in the plan view of the first right plate portion 38a (or the first left plate portion 38b) from above, a distance L in the front-rear direction between a crosspoint C of a virtual line extend from a rear side and a virtual line extended from the left side (or right side) and the front side is within a range of 1 mm to 50 mm, and is 13 mm, for example. Also, in the plan view of the first right plate portion 38a (or the first left plate portion 38b) from above, an angle θ formed between the rear side and the left side (or right side) is within a range of 0.1 degrees to 90 degrees, and is 45 degrees, for example. The second right plate portion 38c (or the second left plate portion 38d) and the third right plate portion 38e (or the third left plate portion 38f) also have features that are same as the above-mentioned ones.

As illustrated in FIG. 4, at least a part of the plurality of plate portions 38 comprises a plurality of protrusions 40. For example, the upper surface of the first right plate portion 38a comprises a first right-upper protrusion 40a protruding upward from a vicinity of a front end of the first right plate portion 38a and extending in the left-right direction. The upper surface of the first left plate portion 38b comprises a first left-upper protrusion 40b protruding upward from a vicinity of a front end of the first left plate portion 38b and extending in the left-right direction. As illustrated in FIG. 5, the first right-upper protrusion 40a and the first left-upper protrusion 40b have heights in the up-down direction that are substantially equal to each other. A height H in the up-down direction of the first right-upper protrusion 40a (or the first left-upper protrusion 40b) is within a range of 0.15 mm to 1.5 mm, and is 0.5 mm, for example. As illustrated in FIG. 6, the first right-upper protrusion 40a and the first left-upper protrusion 40b have widths in the front-rear direction that are substantially equal to each other. A width W in the front-rear direction of the first right-upper protrusion 40a (or the first left-upper protrusion 40b) is within a range of 0.5 mm to 10 mm, and is 2 mm, for example.

In the present embodiment, the first right-upper protrusion 40a extends continuously in the left-right direction on the upper surface of the first right plate portion 38a. Due to this, when the middle housing 32 is fabricated by way of integral molding of resin material, a mold which defines shapes of the first right plate portion 38a and the first right-upper protrusion 40a can be simply moved linearly leftward to enable the middle housing 32 to be released from the mold. Also, the first left-upper protrusion 40b extends continuously in the left-right direction on the upper surface of the first left plate portion 38b. Due to this, when the left-side housing 30 is fabricated by way of integral molding of resin material, a mold which defines shapes of the first left plate portion 38b and the first left-upper protrusion 40b can be simply moved linearly rightward to enable the left-side housing 30 to be released from the mold.

Figure 7:
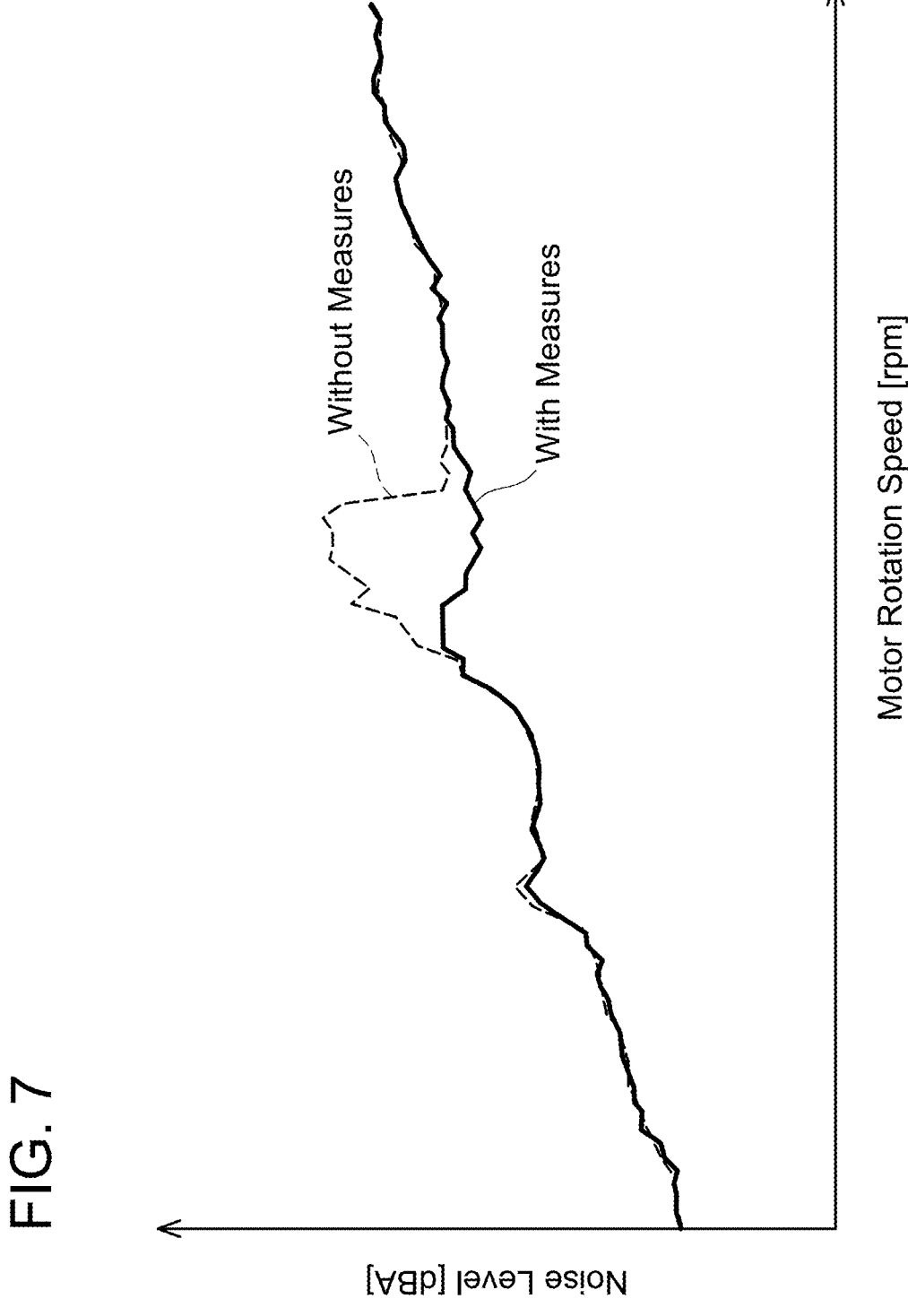
FIG. 7 shows a graph showing a relation between a motor rotation speed and a noise level with respect to the blower 2 according to the embodiment and a blower 2 according to a comparative example.

FIG. 7 is a graph showing the influence of the presence or absence of the first right-upper protrusion 40a and the first left-upper protrusion 40b on the noise during use of the blower 2. A plot of "Without Measures" in FIG. 7 shows a noise level during use of the blower 2 when the first right-upper protrusion 40a and the first left-upper protrusion 40b are absent. As is apparent from FIG. 7, in this case, the noise during use of the blower 2 is particularly loud at a specific motor rotation speed. This is considered to be because, without the first right-upper protrusion 40a or the first left-upper protrusion 40b, vortex flow is periodically generated at the front end of the first right plate portion 38a and/or the front end of the first left plate portion 38b, and thus the frequency at which this vortex flow occurs coincides the vibratory resonant frequency of the plurality of plate portions 38 and/or the straight tube portion 24b or the acoustic resonant frequency of the straight tube portion 24b, resulting in the plurality of plate portions 38 and/or the straight tube portion 24b vibrating resonantly, or the straight tube portion 24b resonating acoustically.

Contrary to this, a plot of "With Measures" in FIG. 7 shows a noise level during use of the blower 2 when there are the first right-upper protrusion 40a and the first left-upper protrusion 40b. As is apparent from FIG. 7, in this case, the noise during use of the blower 2 is not particularly great at a specific motor rotation speed. This is considered to be because the first right-upper protrusion 40a and/or the first left-upper protrusion 40b suppressed periodical generation of vortex flow at the front end of the first right plate portion 38a and/or the front end of the first left plate portion 38b, resulting in reduced vibratory resonance of the plurality of plate portions 38 and/or the straight tube portion 24b or reduced acoustic resonance of the straight tube portion 24b.

Modifications

The first right plate portion 38a, the second right plate portion 38c, and the third right plate portion 38c may be parts that are separate from the middle housing 32, and for example may be secured to the middle housing 32 via a fastener and/or adhesive. The first left plate portion 38b, the second left plate portion 38d, and the third left plate portion 38f may be parts that are separate from the left-side housing 30, and for example may be secured to the middle housing 32 via a fastener and/or adhesive. Each of the first right plate portion 38a, the first left plate portion 38b, the second right plate portion 38c, the second left plate portion 38d, the third right plate portion 38e, and the third left plate portion 38f may have a shape different from that of the above embodiment. The right end of the first right plate portion 38a and the left end of the first left plate portion 38b may not be in contact with each other. The right end of the second right plate portion 38c and the left end of the second left plate portion 38d may not be in contact with each other. The right end of the third right plate portion 38e and the left end of the third left plate portion 38f may not be in contact with each other.

The first right-upper protrusion 40a may be consist of a part separate from the first right plate portion 38a, and may be secured to the first right plate portion 38a with a fastener and/or adhesive. The first left-upper protrusion 40b may be consist of a part separate from the first left plate portion 38b, and may be secured to the first left plate portion 38b with a fastener and/or adhesive.

The first right-upper protrusion 40a (or the first left-upper protrusion 40b) may be disposed apart from the front end of the first right plate portion 38a (or the first left plate portion 38b), and for example may be disposed within a range from the front end to a spot a predetermined distance (such as 5 mm) away from the front end in the front-rear direction. Further, in a plan view of the first right plate portion 38a (or the first left plate portion 38b) from above, a direction in which the first right-upper protrusion 40a (or the first left-upper protrusion 40b) extends may be inclined with respect to the left-right direction.

Figure 8:
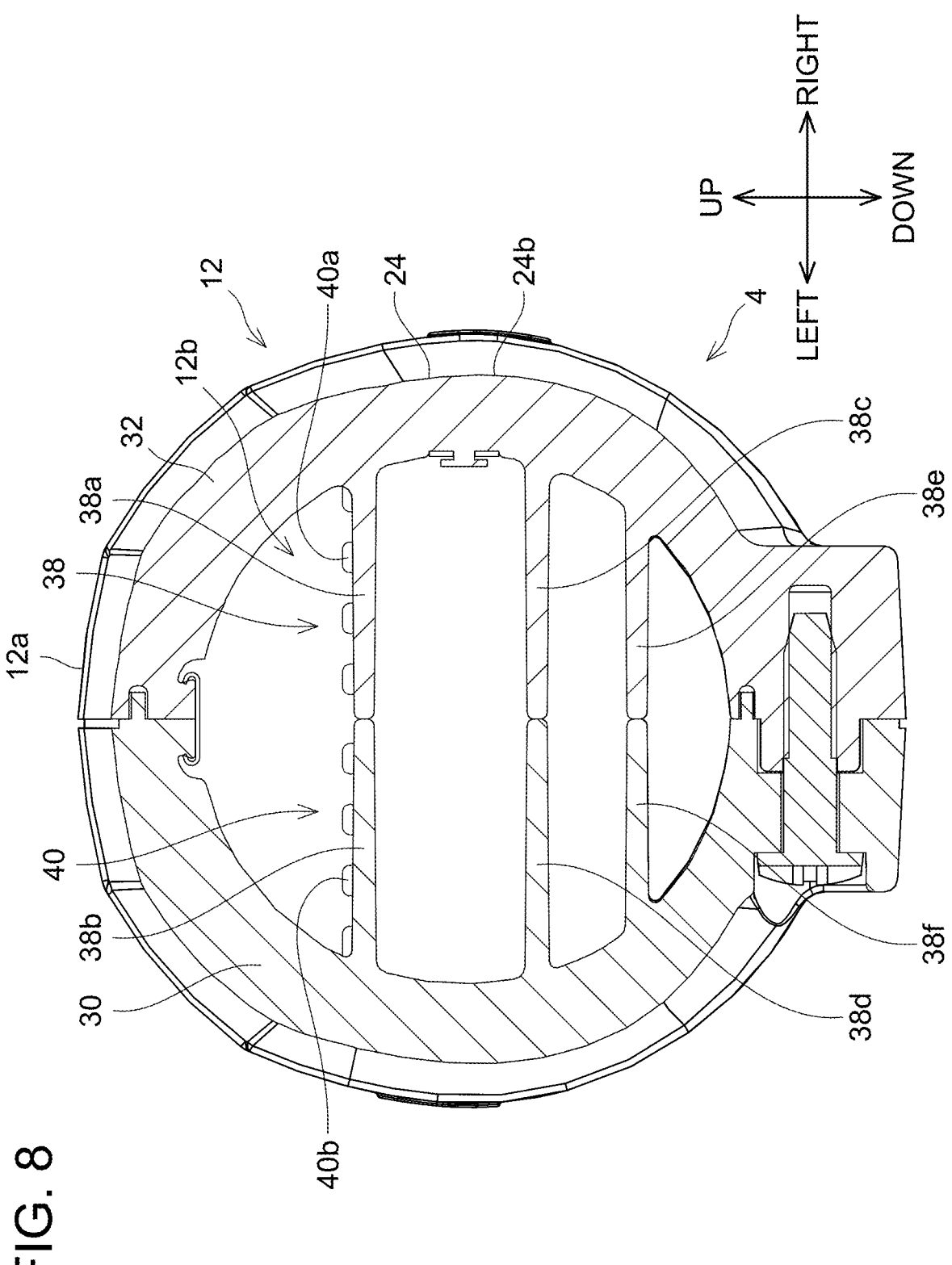
FIG. 8 illustrates a cross-sectional view of an exhaust port 12 and its surroundings of a blower 2 according to a modification.

As illustrated in FIG. 8, each of the first right-upper protrusion 40a and the first left-upper protrusion 40b may not be arranged continuously in the left-right direction, but may comprise a plurality of protrusions, and the protrusions may be arranged intermittently.

Figure 9:
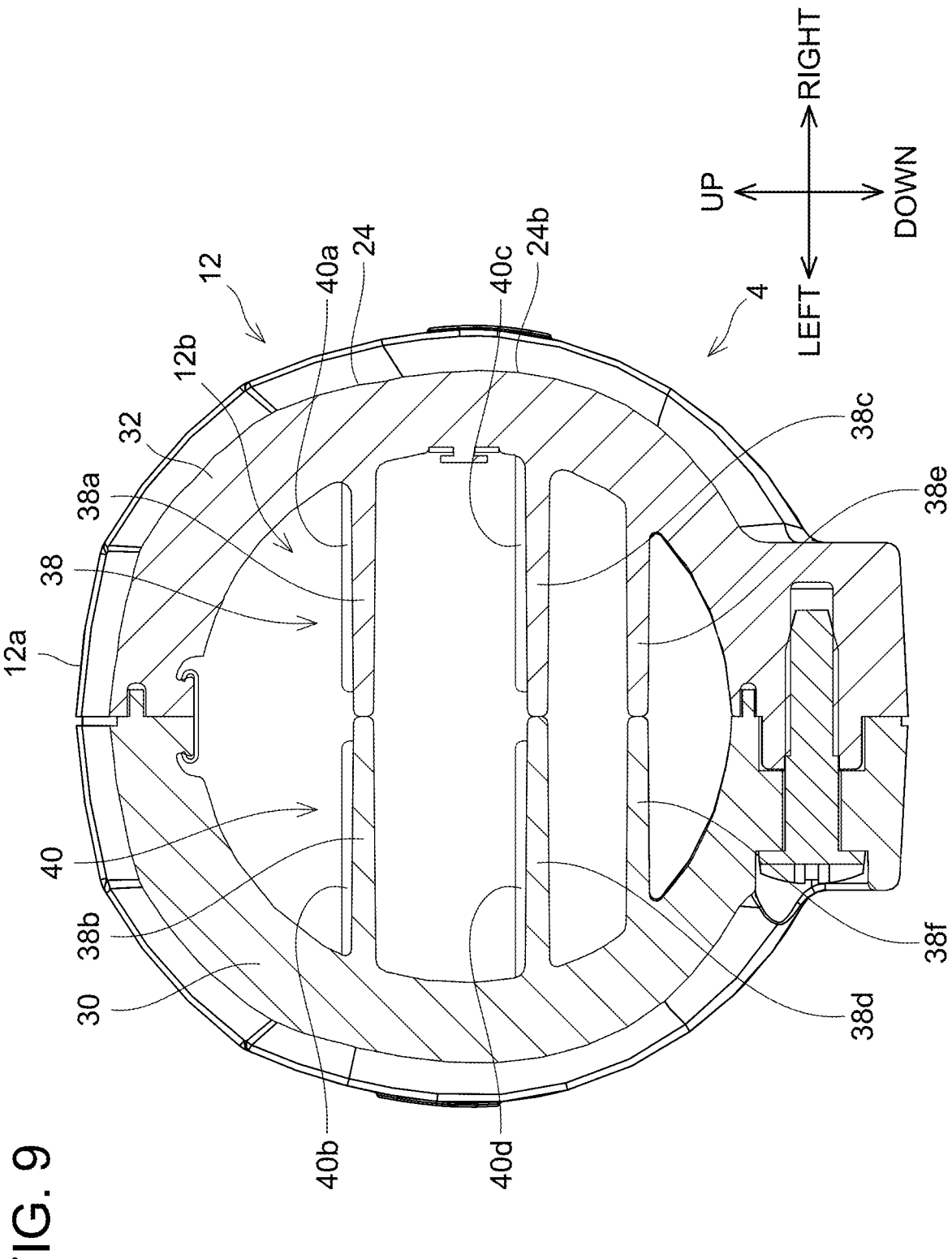
FIG. 9 illustrates a cross-sectional view of an exhaust port 12 and its surroundings of a blower 2 according to another modification.

As illustrated in FIG. 9, the protrusions 40 may be disposed on plate portions 38 also other than the first right plate portion 38a and the first left plate portion 38b. In an example shown in FIG. 9, in addition to the example shown in FIG. 5, the upper surface of the second right plate portion 38c comprises a second right-upper protrusion 40c, and the upper surface of the second left plate portion 38d comprises a second left-upper protrusion 40d. Positions and/or shapes of the second right-upper protrusion 40c and the second left-upper protrusion 40d may be substantially same as or may differ from the positions and/or shapes of the first right-upper protrusion 40a and the first left-upper protrusion 40b.

Figure 10:
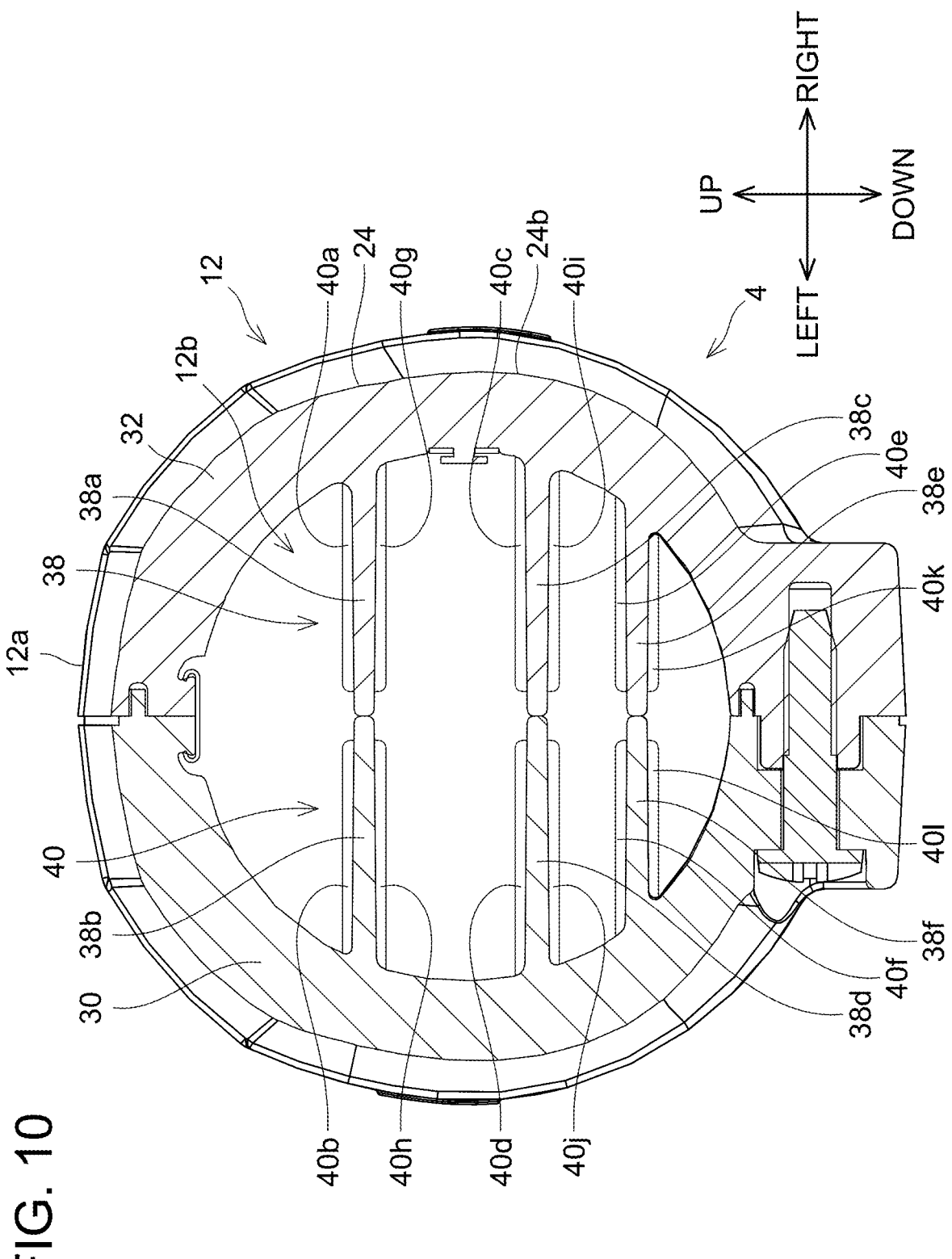
FIG. 10 illustrates a cross-sectional view of an exhaust port 12 and its surroundings of a blower 2 according to yet another modification.

As illustrated in FIG. 10, the protrusions 40 may be disposed on the lower surfaces of the plate portions 38. In an example shown in FIG. 10, in addition to the example shown in FIG. 9, the upper surface of the third right plate portion 38e comprises a third right-upper protrusion 40c, and the upper surface of the third left plate portion 38f comprises a third left-upper protrusion 40f. Also, the lower surface of the first right plate portion 38a comprises a first right-lower protrusion 40g, and the lower surface of the first left plate portion 38b comprises a first left-lower protrusion 40h. The lower surface of the second right plate portion 38c comprises a second right-lower protrusion 40i, and the lower surface of the second left plate portion 38d comprises a second left-lower protrusion 40j. The lower surface of the third right plate portion 38e comprises a third right-lower protrusion 40k, and the lower surface of the third left plate portion 38f comprises a third left-lower protrusion 40l.

The number of the plurality of plate portions 38 may be more or fewer than the one of the above-described embodiment.

The blower 2 may comprise an axial fan (not illustrated) or a mixed flow fan (not illustrated), instead of the fan 6.

As a prime mover configured to rotate the fan 6, the blower 2 may comprise an internal engine (not illustrated), instead of the electric motor 8. Alternatively, the blower 2 may comprise another type of electric motor (not illustrated) such as a brushless motor, instead of the electric motor 8.

The blower 2 may comprise, instead of the power cable 20, a battery receptacle (not illustrated) configured to have a rechargeable battery pack (not illustrated) detachably attached thereto. In this case, the electric motor 8 may operate on electric power supplied from the battery pack.

Features of Embodiment

As mentioned above, in one or more embodiments, the blower 2 comprises: the electric motor 8 (example for a prime mover); the fan 6 configured to be driven by the electric motor 8; the straight tube portion 24b (example for a blower duct) through which an airflow generated by the fan 6 flows; the plate portions 38 disposed inside the straight tube portion 24b and having side surfaces extending along a direction in which the airflow flows; and the protrusions 40 protruding from the side surfaces near the downstream ends of the plate portions 38 in a direction blocking the airflow.

According to the above configuration, since the protrusions 40 are disposed near the downstream ends of the plate portions 38, periodical generation of vortex flow can be suppressed at the downstream ends of the plate portions 38. Due to this, the vibratory resonance of the plate portions 38 and/or straight tube portion 24b or the acoustic resonance of the straight tube portion 24b can be suppressed, by which generation of loud noise can also be suppressed.

In one or more embodiments, with respect to the direction blocking the airflow, a height of the protrusions 40 is within a range of 1% to 50% of the thickness of the plate portions 38.

According to the above configuration, periodical generation of vortex flow can be suppressed without greatly affecting an air volume of the blower 2.

In one or more embodiments, with respect to the direction in which the airflow flows, a width of the protrusions 40 is within a range of 1% to 50% of a minimum width of the plate portions 38.

According to the above configuration, without greatly affecting the air volume of the blower 2, periodical generation of vortex flow can be suppressed.

In one or more embodiments, the protrusions 40 are arranged intermittently.

According to the above configuration, as compared to a case where each of the protrusions 40 is continuously disposed, an effect thereof imposed on the air volume of the blower 2 can be mitigated.

In one or more embodiments, each of the protrusions 40 may be arranged continuously.

According to the above configuration, when the plate portions 38 including the protrusions 40 are produced by integral molding of a resin material, workability in releasing of the plate portions 38 from a mold can be improved.

In one or more embodiments, the protrusions 40 are arranged only on one (e.g., upper surface) of the side surfaces of the plate portion(s) 38, and the protrusions 40 are not arranged on the other (e.g., lower surface) of the side surfaces of the plate portion(s) 38.

According to the above configuration, as compared to a case where the protrusions 40 are disposed on both surfaces of the plate portion(s) 38, an effect thereof imposed on the air volume of the blower 2 can be mitigated.

In one or more embodiments, the electric motor 8 functions as a prime mover configured to drive the fan 6.

When the electric motor 8 is used as the prime mover, it is more quiet when the electric motor 8 operates than when an internal engine (not illustrated) is used as the prime mover. As such, if loud noise is generated in using the electric motor 8, user comfort would be greatly impaired. According to the above configuration, in the blower 2 which uses the electric motor 8 as the prime mover, generation of loud noise can be suppressed.

What is claimed is:
1. A blower comprising:
a prime mover;
a fan configured to be driven by the prime mover;
a blower duct formed as a straight tube portion through which an airflow generated by the fan flows in a frontward direction from a rear toward a front of the straight tube portion;
a plate portion disposed inside the blower duct and having an upper side surface and a lower side surface extending along the frontward direction in which the airflow flows; and
a protrusion protruding from at least one of the upper side surface and the lower side surface in an up-down direction orthogonal to the frontward direction in which the airflow flows, and extends in a right-left direction along the at least one of the upper side surface and the lower side surface, wherein the protrusion protrudes only from a downstream edge of the at least one of the upper side surface and the lower side surface,
wherein a height of the protrusion in the up-down direction is within a range of 1% to 50% of a thickness of the plate portion in the up-down direction and a width of the protrusion in the frontward direction is within a range of 1% to 50% of a minimum width of the plate portion in the frontward direction.
2. The blower according to claim 1, wherein the protrusion comprises a plurality of protrusions, and
the protrusions are arranged intermittently.
3. The blower according to claim 1, wherein the protrusion is arranged continuously.
4. The blower according to claim 1, wherein the protrusion is arranged only on one of the upper side surfaces and the lower side surface of the plate portion, and the protrusion is not arranged on the other of the upper side surface and the lower side surface of the plate portion.
5. The blower according to claim 1, wherein the prime mover is an electric motor.
6. The blower according to claim 4, wherein,
the protrusion comprises a plurality of protrusions arranged intermittently, or the protrusion is arranged continuously,
and
the prime mover is an electric motor.
7. The blower according to claim 1, wherein the plate portion has a substantially right angle trapezoidal shape in a plan view from above.
8. The blower according to claim 1, wherein the thickness of the plate portion in the up-down direction is within a range of 0.1 mm to 5 mm.
9. The blower according to claim 1, wherein the height of the protrusion in the up-down direction is within a range of 0.15 mm to 1.5 mm.
10. The blower according to claim 1, wherein the minimum width of the plate portion in the frontward direction is within a range of 1 mm to 50 mm.
11. The blower according to claim 1, wherein the width of the protrusion in the frontward direction is within a range of 0.5 mm to 10 mm.
12. The blower according to claim 1, wherein,
the thickness of the plate portion in the up-down direction is within a range of 0.1 mm to 5 mm, and the minimum width of the plate portion in the frontward direction is within a range of 1 mm to 50 mm.

13. The blower according to claim 1, wherein, the height of the protrusion in the up-down direction is within a range of 0.15 mm to 1.5 mm, and the width of the protrusion in the frontward direction is within a range of 0.5 mm to 10 mm.

14. The blower according to claim 1, wherein, the thickness of the plate portion in the up-down direction is within a range of 0.1 mm to 5 mm, the height of the protrusion in the up-down direction is within a range of 0.15 mm to 1.5 mm, the minimum width of the plate portion in the frontward direction is within a range of 1 mm to 50 mm, and the width of the protrusion in the frontward direction is within a range of 0.5 mm to 10 mm.

\*    \*    \*    \*    \*